United States Patent
Rathi et al.

(10) Patent No.: US 7,823,199 B1
(45) Date of Patent: Oct. 26, 2010

(54) METHOD AND SYSTEM FOR DETECTING AND PREVENTING ACCESS INTRUSION IN A NETWORK

(75) Inventors: Manish M. Rathi, San Jose, CA (US); Vipin K. Jain, Santa Clara, CA (US); Shehzad T. Merchant, Mountain View, CA (US); Victor C. Lin, Fremont, CA (US)

(73) Assignee: Extreme Networks, Santa Clara, CA (US)

(*) Notice: Subject to any disclaimer, the term of this patent is extended or adjusted under 35 U.S.C. 154(b) by 890 days.

(21) Appl. No.: 10/794,203

(22) Filed: Mar. 5, 2004

Related U.S. Application Data

(63) Continuation-in-part of application No. 10/774,079, filed on Feb. 6, 2004, and a continuation-in-part of application No. 10/773,487, filed on Feb. 6, 2004, and a continuation-in-part of application No. 10/773,394, filed on Feb. 6, 2004.

(51) Int. Cl.
  *G06F 12/14* (2006.01)
  *G06F 15/173* (2006.01)
  *G08B 23/00* (2006.01)
  *H04W 4/00* (2009.01)
(52) U.S. Cl. .................. 726/22; 726/23; 380/278; 709/224; 709/227; 709/238; 370/338; 455/410
(58) Field of Classification Search .................. 726/23, 726/22; 380/270
  See application file for complete search history.

(56) References Cited

U.S. PATENT DOCUMENTS

| | | | |
|---|---|---|---|
| 5,265,005 A | 11/1993 | Schmidt et al. | |
| 5,412,721 A | 5/1995 | Rager et al. | |
| 5,598,412 A | 1/1997 | Griffith et al. | |
| 5,659,604 A | 8/1997 | Beckmann | |
| 6,137,802 A | 10/2000 | Jones et al. | |
| 6,252,507 B1 | 6/2001 | Gagnon | |
| 6,304,851 B1 | 10/2001 | Kmack et al. | |
| 6,363,489 B1* | 3/2002 | Comay et al. | 726/22 |
| 6,400,925 B1 | 6/2002 | Tirabassi et al. | |
| 6,459,557 B1 | 10/2002 | Haensgen et al. | |
| 6,584,113 B1 | 6/2003 | Manduley et al. | |
| 6,654,588 B2 | 11/2003 | Moskowitz et al. | |
| 6,687,833 B1* | 2/2004 | Osborne et al. | 726/23 |

(Continued)

OTHER PUBLICATIONS

Yongguang Zhang and Wenke Lee, "Intrusion Detection in Wireless Ad-Hoc Networks," ACM MOBICOM, 2000, pp. 275-283.*

(Continued)

*Primary Examiner*—Kaveh Abrishamkar
(74) *Attorney, Agent, or Firm*—Blakely Sokoloff Taylor & Zafman LLP

(57) ABSTRACT

A wireless computer network includes components cooperating together to prevent access intrusions by detecting unauthorized devices connected to the network, disabling the network connections to the devices, and then physically locating the devices. The network can detect both unauthorized client stations and unauthorized edge devices such as wireless access points (APs). The network can detect intruders by monitoring information transferred over wireless channels, identifying protocol state machine violations, tracking roaming behavior of clients, and detecting network addresses being improperly used in multiple locations. Upon detecting an intruder, the network can automatically locate and shut off the physical/logical port to which the intruder is connected.

16 Claims, 2 Drawing Sheets

U.S. PATENT DOCUMENTS

| | | | |
|---|---|---|---|
| 6,732,176 | B1 | 5/2004 | Stewart et al. |
| 6,766,453 | B1 | 7/2004 | Nessett et al. |
| 6,986,021 | B2 | 1/2006 | Master et al. |
| 7,140,040 | B2* | 11/2006 | McBrearty et al. ............ 726/23 |
| 7,159,237 | B2* | 1/2007 | Schneier et al. ................ 726/3 |
| 7,181,530 | B1* | 2/2007 | Halasz et al. ............... 709/238 |
| 7,251,725 | B2 | 7/2007 | Loison et al. |
| 7,370,362 | B2 | 5/2008 | Olson et al. |
| 7,440,573 | B2 | 10/2008 | Lor et al. |
| 2001/0045451 | A1 | 11/2001 | Tan et al. |
| 2001/0046224 | A1 | 11/2001 | Ryu |
| 2002/0040389 | A1 | 4/2002 | Gerba et al. |
| 2002/0055924 | A1 | 5/2002 | Liming |
| 2002/0066034 | A1* | 5/2002 | Schlossberg et al. ........ 713/201 |
| 2002/0197978 | A1* | 12/2002 | Zavidniak ................... 455/410 |
| 2003/0031188 | A1 | 2/2003 | Ishibashi |
| 2003/0033413 | A1* | 2/2003 | Willson et al. ............. 709/227 |
| 2003/0058095 | A1 | 3/2003 | Satoh |
| 2003/0065934 | A1* | 4/2003 | Angelo et al. ............... 713/200 |
| 2003/0135762 | A1* | 7/2003 | Macaulay ................... 713/201 |
| 2003/0142641 | A1 | 7/2003 | Sumner et al. |
| 2003/0149887 | A1 | 8/2003 | Yadav |
| 2004/0125781 | A1 | 7/2004 | Walter et al. |
| 2004/0224690 | A1 | 11/2004 | Choi et al. |
| 2004/0252837 | A1* | 12/2004 | Harvey et al. ............... 380/270 |
| 2004/0255154 | A1 | 12/2004 | Kwan et al. |
| 2005/0114473 | A1 | 5/2005 | Guy et al. |
| 2005/0149443 | A1 | 7/2005 | Torvinen |
| 2005/0254474 | A1 | 11/2005 | Iyer et al. |
| 2007/0064647 | A1 | 3/2007 | Prasad |
| 2008/0043686 | A1 | 2/2008 | Sperti et al. |

OTHER PUBLICATIONS

Sonali Bhargava and Dharma Agrawal, "Security Enhancements in AODV protocol for Wireless Ad Hoc Networks," IEEE 2001, pp. 2143-2147.*

Nikita Borisov, Ian Goldberg, and David Wagner, "Intercepting Mobile Communications: The Insecurity of 802.11," 2001, pp. 1-13.*

W. Arbaugh, N. Shankar, Y.C. Justin Wan, "Your 802.11 Wireless Network has No Clothes," Mar. 30, 2001, pp. 1-13.*

Funk Software, Inc., "Product News: RADIUS/AAA Solutions on Wireless Networks", Sep. 30, 2002, available at: http://web.archive.org/web/20040215160450/www.funk.com/radius/News/wireless.asp.

Funk Software, Inc., "Data Sheet: Steel-Belted Radius/Global Enterprise Edition", Feb. 4, 2004, avail. at: http://web.archive.org/web/20040204113333/www.funk.com/radius/enterprise/gee_ds.asp.

Funk Software, Inc., "Data Sheet: Steel-Belted Radius/GEE Appliance", Feb. 4, 2004, avail. at: http://web.archive.org/web/20040204113816/www.funk.com/radius/enterprise/nei_gee_ds.asp.

Funk Software, Inc., "White Paper: Centralized Remote Access Authentication with RADIUS", Feb. 4, 2004, avail. at: http://web.archive.org/web/20040215054514/www.funk.com/radius/Solns/rad_wp.asp.

Funk, P. et al., "EAP Tunneled TLS Authentication Protocol (EAP-TTLS)", Mar. 2002, avail. at: http://www.ietf.org/proceedings/02mar/slides/eap-l/sld001.htm.

Blunk, L. et al., "PPP Extensible Authentication Protocol (EAP)", RFC 2284, Network Working Group, Mar. 1998, avail. at: http://www.faqs.org/rfcs/rfc2284.html.

Hussain, S., "How to Convert Ether Type Packet to 802.11", Apr. 18, 2002, avail. at: http://lists.linux-wlan.com/pipermail/linux-wlan-devel/2002-April/001036.html.

Zorn, G., "Deriving Keys for Use With Microsoft Point-to-Point Encryption (MPPE)", RFC 3079, Network Working Group, Mar. 2001, avail. at: http://www/faqs.org/rfcs/rfc3079.html.

Calhoun, P. et al., "Extensible Authentication Protocol Support in RADIUS", RFC 2138, RADIUS Working Group, May 8, 1998, avail. at: http:/www.freeradius.org/rfc/draft-ietf-radius-eap-05.txt.

Zorn, G., "Microsoft Vendor-Specific RADIUS Attributes", RFC 2548, Network Working Group, Mar. 1999, avail. at: http://www.faqs.org/rfcs/rfc2548.html.

Funk Software, "Comprehensive RADIUS/AAA Solution for the Global Enterprise", Feb. 22, 2003, pp. 1-6, obtained from http://web.archive.org/web/20030222134138/http://www.funk.com/radius/enterprise/gee_ds.asp and htttp://web.archive.org/web/20030202140410/www.funk.com/radius/enterprise/feat_ee_rfc.asp, which is a link from the first mentioned page.

Office Action for U.S. Appl. No. 10/774,079 Mailed Apr. 30, 2008, 22 pages.

Final Office Action for U.S. Appl. No. 10/774,079 Mailed Feb. 2, 2009, 28 pages.

Office Action for U.S. Appl. No. 10/774,079 Mailed Oct. 5, 2009, 35 pages.

Final Office Action for U.S. Appl. No. 10/774,079 Mailed May 24, 2010, 40 pages.

Office Action for U.S. Appl. No. 10/773,394 Mailed Feb. 20, 2007, 19 pages.

Restriction Requirement for U.S. Appl. No. 10/773,394 Mailed Sep. 7, 2007, 9 pages.

Office Action for U.S. Appl. No. 10/773,394 Mailed Nov. 27, 2007, 12 pages.

Final Office Action for U.S. Appl. No. 10/773,394 Mailed Aug. 6, 2008, 12 pages.

Notice of Allowance for U.S. Appl. No. 10/773,394 Mailed Apr. 16, 2009, 12 pages.

Office Action for U.S. Appl. No. 10/773,487 Mailed Mar. 23, 2006, 11 pages.

Office Action for U.S. Appl. No. 10/773,487 Mailed Feb. 21, 2007, 4 pages.

Final Office Action for U.S. Appl. No. 10/773,487 Mailed Sep. 21, 2006, 5 pages.

Notice of Allowance for U.S. Appl. No. 10/773,487 Mailed Sep. 6, 2007, 7 Pages.

Office Action for U.S. Appl. No. 11/961,677 Mailed Sep. 2, 2009., 13 pages.

Final Office Action for U.S. Appl. No. 11/961,677 Mailed May 11, 2020., 12 pages.

* cited by examiner

METHOD AND SYSTEM FOR DETECTING AND PREVENTING ACCESS INTRUSION IN A NETWORK

RELATED APPLICATIONS

This application is a continuation-in-part of related U.S. patent application Ser. No. 10/774,079, entitled "Method And System For Location-Based Access Control In A Computer Network"; U.S. patent application Ser. No. 10/773,394, entitled "Apparatus, Method and System For Improving Network Security"; U.S. patent application Ser. No. 10/773,487, entitled "Unified Adaptive Network Architecture". The foregoing applications were filed on Feb. 6, 2004, and are owned in common by the assignee hereof. Moreover, each of these applications is fully incorporated herein by reference as though set forth in full.

FIELD OF THE INVENTION

This invention generally relates to computer networks, and more specifically, to the security of wireless computer networks.

BACKGROUND OF THE INVENTION

Computer security, particularly network security, has become a significant concern in recent years. Network security concerns generally fall into two categories: privacy and access control. Privacy mechanisms are used on networks to prevent the publication of otherwise private information; while access control protocols are designed to prevent unauthorized access to computer networks and the information stored on computers connected to the networks. Without access control features in place, unauthorized users can access a network and steal or corrupt stored information, or disrupt operation of the network. Unauthorized access is of particular concern on networks that provide access to sensitive information, e.g., those used in enterprise environments, such as corporations or government entities.

Wireless computer networks are being increasingly deployed in commercial and institutional campus environments, and network owners and users are concerned about the security holes that they create. Controlling access to wireless data networks is more difficult than controlling access to conventional wired networks because over-the-air radio channels travel outside of buildings and campuses. Thus, to prevent unauthorized access, it isn't sufficient to simply limit physical access to the wireless connection points. In wireless local area networks (LANs), rogue (unauthorized) access points (APs) can be deployed by end users that are hard to track down and locate. In addition, rogue (unauthorized) wireless client stations can assault networks with denial of service attacks and gain unauthorized access using stolen client station credentials, such as user IDs and passwords. Accordingly, new security techniques are needed to monitor wireless networks and identify and prevent access intrusions, and also to proactively disconnect unauthorized edge devices and client stations from the network.

SUMMARY

The invention provides an improved method and system for monitoring the security of a wireless computer network to identify and prevent access intrusions, including denial-of-service attacks.

In accordance with an exemplary embodiment of the present invention, components of a wireless computer network cooperate together to prevent access intrusions by detecting unauthorized devices connected to the network, disabling the network connections to the devices, and then physically locating the devices. The devices detected by the network can be either rogue client stations or rogue edge devices, such as unauthorized wireless APs. A rogue wireless AP is a particularly pernicious intruder on a wireless network because it can potentially admit multitudes of unauthorized wireless client stations into an otherwise secured network.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Although described in the context of an IEEE 802.11 Wi-Fi network, the systems and algorithms disclosed herein can be generally applied to any mobile network.

Figure 1:
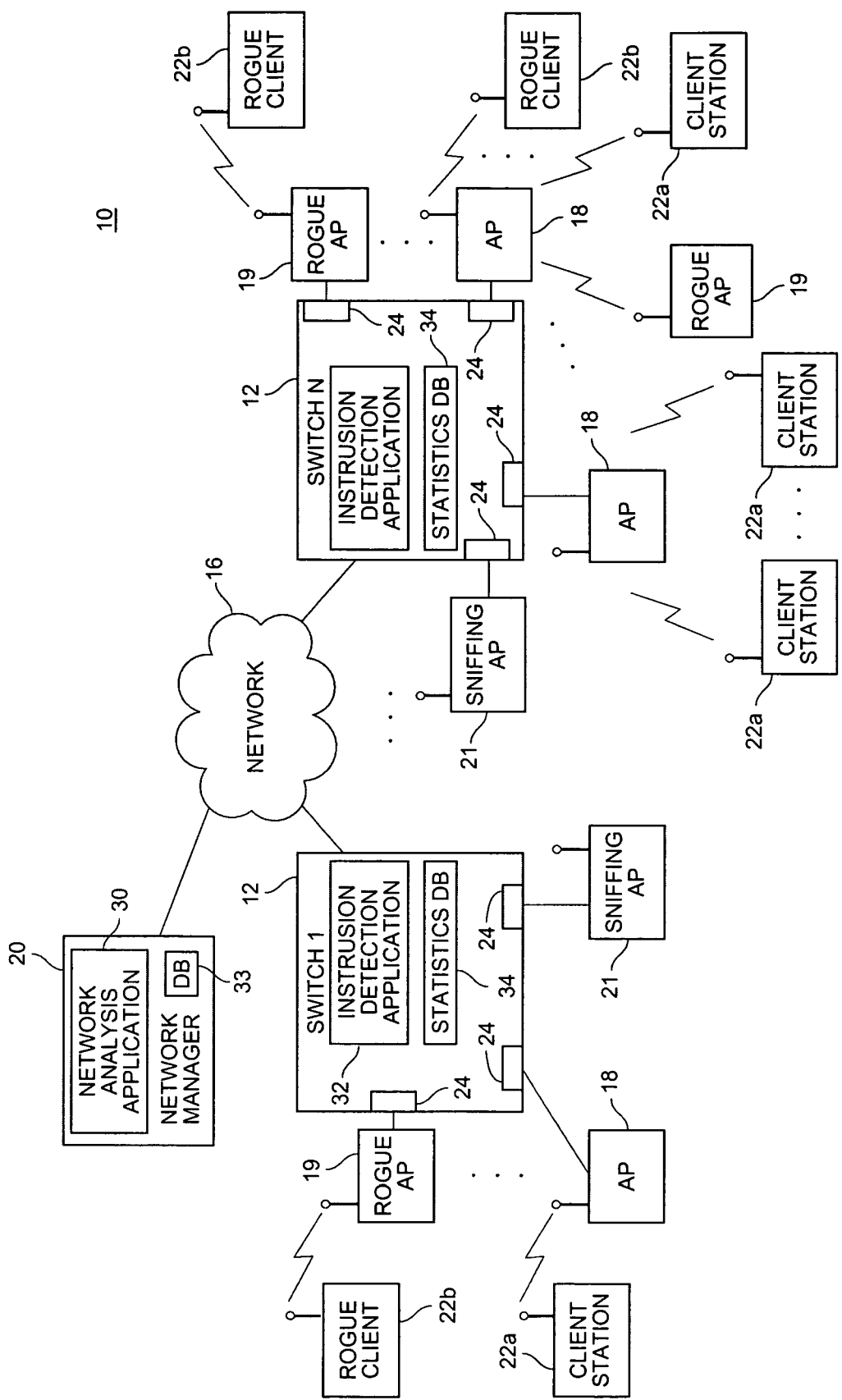
FIG. 1 is a conceptual diagram of an exemplary computer network system in accordance with an embodiment of the present invention.

FIG. 1 is a conceptual diagram of an exemplary computer system 10 in accordance with an embodiment of the present invention. The system 10 includes one or more network switches 12 that communicate with a network manager 20 by way of a network 16. A plurality of wireless network edge devices 18,19,21 are connected to the ports 24 of the switches 12. Wireless edge devices 18,19 permit mobile user stations 22a,b to access the network 16 over one or more wireless channels. The edge devices 18,19 are devices such as wireless access points (APs). The switches 12 can also support wired devices (not shown), such as personal computers or voice over IP phones, that directly connect to the switch ports 24 using a wired connection, such as a standard Ethernet cable.

Rogue clients 22b and rogue edge devices 19 are unauthorized devices that are intruding onto the system 10.

The sniffing APs 21 are network components that are configured to eavesdrop on wireless channels in order to detect rogue APs 19 and clients 22b.

The network manager 20 is a networked server running application software that allows network administrators to configure the switches 12 and the edge devices 18,21. The network manager 20 includes a network analysis application 30 and a database (DB) 33 for detecting activities on a network-wide basis that indicate the presence of unauthorized intruders.

The switches 12 and network manager 20 can communicate with one another using any suitable access mechanism, such as simple network message protocol (SNMP), Telnet, TCP/IP, HTTP, or the like. The network manager 20 can alternatively be connected directly with the switches 12 to bypass the network 16. Any suitable data network can be used to connect these components. Preferably, the data network 16 is an Ethernet network. In addition, the network 16 can also include other networking components (not shown), such as gateways, routers, additional servers hosting a variety of different applications, as well as links to other networks, such as an enterprise intranet or the public Internet.

The network switches 12 can be CPU-based local area network (LAN) Ethernet switches configured to conform with the principles of the intrusion detection and prevention scheme disclosed herein. Each switch 12 includes one or more ports 24 corresponding to each of the network edge devices 18,19,21. The ports 24 permit network communications between the edge devices 18,19,21 and the network 16. Each switch 12 also includes an intrusion detection software application 32 and a statistics database (DB) 34 used by the applications 30,32.

The system 10 is configured to detect and prevent unauthorized network access by two different types of intruders: rogue edge devices 19 and rogue clients 22b (e.g. end user stations). The system 10 can detect the two types of intruders whether they are attached to the switches 12 shown in FIG. 1, or attached to conventional switches (not shown) that lack intrusion detection components, yet are also included in the network system 10.

In an IEEE 802.11 environment, the system 10 can detect rogue edge devices 19 in several different ways. For example, the system 10 can monitor wireless channels for beacon frames emitted by the unauthorized edge devices 19. Another monitoring technique involves transmitting a probe request and then detecting the probe response from the unauthorized edge devices 19. The network can also monitor packet information, such as media access control (MAC) addresses transmitted on the wireless channel used by the unauthorized edge devices 19. Each of these techniques is discussed in greater detail below in connection with FIG. 2.

On the other hand, rogue client stations 22b are detected using similar and some additional techniques. To detect rogue client stations 22b the system 10 can compare the roaming behavior of client stations 22a,b to roaming statistics in order to detect anomalous roaming patterns exhibited by the rogue client stations 22b. In addition, the system 10 can also compare client station credentials received at difference edge devices 18,21 network-wide to detect rogue clients 22b logged onto the network 16 using credentials stolen from legitimate users. The system 10 can also monitor packet information, such as MAC addresses transmitted on the wireless channels by the unauthorized client stations 22b. Further, the system 10 can identify protocol state machine violations, such as too many association requests, probe requests, or the like over a predefined period of time to detect denial of service attacks. The techniques for detecting rogue client stations 22b are discussed in greater detail in connection with FIG. 3.

Figure 2:
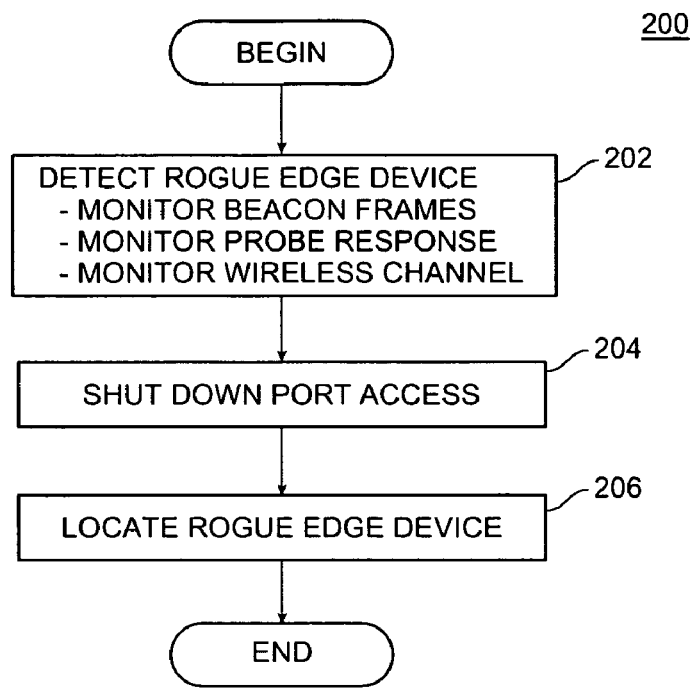
FIG. 2 is a flow chart illustrating a method of detecting rogue edge devices in the system of FIG. 1 in accordance with another embodiment of the invention.
Figure 3:
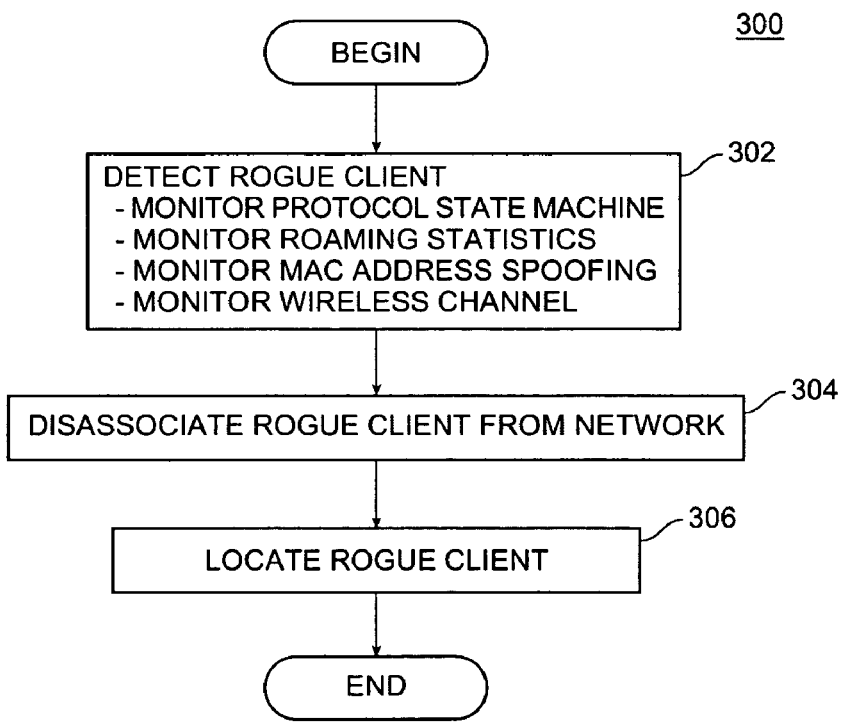
FIG. 3 is a flow chart illustrating a method of detecting rogue client stations in the system of FIG. 1 in accordance with a further embodiment of the invention.

FIGS. 2-3 describe methods to detect and prevent access intrusion in the system 10. The basis for the intrusion detection and prevention system is a set of algorithms built on the network switches 12 and APs 18 that work in conjunction with network wide analysis algorithms residing on the network manager 20. The algorithms are implemented, in part, by the network analysis application 30 and intrusion detection application 32. The combination of intelligent network devices 12,18,21 to collect certain kinds of information, and the network-wide analysis application 30 to apply algorithms on the collected data, provide unique methods for detecting and fixing access intrusions.

FIG. 2 is a flow chart illustrating a method 200 of detecting rogue edge devices 19 in the system 10 of FIG. 1 in accordance with an embodiment of the invention. In step 202, the system detects a rogue edge device 19. The system 10 can detect rogue edge devices 19 in several different ways.

First, the system 10 can monitor wireless channels for beacon frames emitted by unauthorized edge devices 19. This monitoring would include beacon frame reception from all sources in the current channel. In addition, edge devices 18 actively send out probe requests to trigger probe responses from the unauthorized edge devices 19 in question. The received responses can then be verified against a database (DB) 33 maintained within intrusion detection application 32 on the network manager 20. Application 32 maintains a list of the valid edge devices 18 approved by the network administrator, a list of supported Network SSIDs allowed in the beacon frames, and the security policies allowed in the given institution or enterprise. Thus, the intrusion detection application 32 can perform a number of verification steps to ensure that unauthorized edge devices 19 are isolated.

These verification steps can include: 1. verifying that the MAC address is from an approved vendor, 2. verifying that the MAC address is known to the network administrator, 3. verifying that the SSID is from a list of supported SSIDs, and/or 4. verifying that the security policies, such as wep encryption and 802.1x encryption match the network administrator's security policies.

The network can also monitor packet information, such as media access control (MAC) addresses transmitted on the wireless channel used by the unauthorized edge device 19. A reason for doing this type of monitoring is because the beacon frames of rogue edge devices can be turned off by malicious users. To monitor traffic on the wireless channel, an edge device (AP) 18 and/or switch 12 connected to the AP 18 records all MAC addresses that are observed on the medium. A wireless medium is shared by nature. If authorized edge devices 18 are deployed in such a way so as to have complete coverage of the medium, the medium is sniffed by deployed edge devices 18 to record all MAC addresses being used in a given medium using a given frequency (or set of frequencies). Alternatively/additionally, sniffing APs 21 can be deployed to specifically monitor and record traffic on the wireless channels. These sniffing APs 21 include an application for recording specific information transmitted on the wireless channels and then forwarding the information to the applications 30,32 for further analysis to detect possible intruders. Using the recorded information, the applications 30,32 can track certain things, such as what clients the rogue edge devices 19 are communicating with, the number of clients connected to such rogue devices 19 and their security characteristics, and any ad hoc networks that may exist.

Other attributes (other than MAC addresses) can also be used to identify unauthorized edge devices 19, such as an Internet (IP) address, session information, or some other upper layer protocol information. The sniffing edge devices 21 (as well as APs 18) can hop through different frequencies using any known methods (such as round robin, preferential sequencing, or the like). Alternatively, dedicated edge devices could be used for different frequencies (or sets of frequencies) for real-time detection and prevention of wireless intruders. Other information that can be recorded is strength of the wireless signal, activity counters, other clients that a given client is trying to communicate with (using address, port and upper layer protocol information).

Once a rogue edge device 19 is identified, the network analysis application 30 can find the switch port 24 to which the rogue edge device 19 is connected, and issue a command to the affected network switch 12 to automatically shut down the port, denying network access to that rogue edge device 19 (step 204).

In step 206, the physical location of the rogue edge device 19 is determined. Preferably, the location attribute techniques for locating an edge device or client, as disclosed in the Related application Ser. No. 10/774,079, entitled "Method And System For Location-Based Access Control In A Computer Network" are used to locate or "triangulate" on the rogue edge device 19. Additionally/alternatively, the gathered wireless channel information mentioned above, such as signal strength, along with location information in the monitoring devices 18 and 21 can be used to isolate the geographic location of the rogue edge device 19. Other techniques of locating a radio source, such as signal triangulation, can also be used by the system 10 to find the rogue edge device 19.

The network analysis application 30 also identifies rogue client stations 22b that have not authenticated to any authorized edge device 18 on the network. This indicates potential eavesdropping or denial-of-service attack on other clients and/or network elements. In addition, the analysis application 30 can find the edge devices 18 with the strongest signal strengths from the rogue client stations 22b, and using location attribute triangulation and/or signal triangulation, isolate the geographic locations of such intruders. Action could then be taken to track down the offending clients 22b and remove them from the premises.

FIG. 3 is a flow chart illustrating a method 300 of detecting rogue client stations 22b in the network system 10 of FIG. 1 in accordance with a further embodiment of the invention. In step 302, the system 10 detects the rogue client stations 22b. The system can detect rogue client stations 22b using several different techniques.

First, network elements can be employed to sniff the medium and record information transmitted on the wireless channels, as discussed above in connection with step 202 of FIG. 2, in order to detect rogue clients 22b.

In addition, the network analysis application 30 also identifies those rogue clients stations 22b that are associated with the same MAC address at two different edge devices 18. In the network system 10, a client station 22a is assigned a unique MAC. The detection of different clients 22a,22b using the same MAC address simultaneously in multiple locations on the network indicates a spoofing attack. The access intrusion can be failed by automatically disassociating the client station 22b, and applying a dynamic policy that prevents that client 22b from accessing the network system 10 again. One potential dynamic policy could temporarily disable access for the client 22b, and notify the administrator of the spoofing attack.

To detect improper, simultaneous use of the same MAC address, each AP 18 records the MAC address for each client station 22a, 22b associated with it. This information can be transferred to and stored in the statistics DB 34 on the switches 12, and it is periodically updated as client stations 22a,22b associate and de-associate from APs 18 as they roam or start and finish their network sessions. Other information, such as the port address, IP address, AP identity, AP location, or the like can be associated with the stored MAC address.

The network analysis application 30 periodically compares the MAC addresses stored in the various statistics DBs 34. If a match is found between MAC addresses at different APs 18, the application 30 has detected an intruder. Furthermore, if the two APs 18 are not in geographic proximity, the probability of a spoofing attack is even higher. The application 30 provides a higher weight to this pattern, and makes the conclusion that a client identity is being spoofed. (It is possible for two neighboring APs to see the same MAC, which can be from a single client. This pattern is given a lower weight, meaning that the application 30 deems this to be a less likely spoofing situation.) Both clients using the same MAC address are shut down (disassociated) and the network administrator is informed. To do this the network analysis application 30 sends a command, via the respective switch(es) 12, to the APs 18 associated with the spoofed client and rogue client 22b. The command causes the APs 18 to disassociate the spoofed client and rogue client 22b. The application 30 also notifies the network administrator of the clients, and their identities and locations. Alternatively, instead of shutting down both clients, only the last client to log on is shut down and the network administrator is notified.

The above principles also apply to user-based security where user authentication credentials (e.g., user IDs, passwords or the like) are used instead of MAC based credentials.

Another technique to detect users attempting to gain unauthorized access is for the network analysis application 30 to build an inventory of all clients 22a and 22b that the various monitoring devices 18 and 21 detect on the wireless channels. Each client that is associated with exactly one edge device 18 can be considered safe for the purpose of this algorithm. Clients 22b that are associated with no device 18, can be considered as potential intruders. Network administrators can be informed of all such devices and their potential location. Clients 22b with the lowest signal strength are typically the users farthest from the radio source, and may well be potential hackers located on the fringe of the network campus (e.g., outlying parking lots). Important to note here is that a client that is "associated" with one edge device 18, may appear as "not-associated" to another edge device 18. The network analysis application builds a global view of all managed devices and runs an algorithm that will not spuriously identify such devices as intruders.

Yet another technique to detect rogue client stations 22b is that the network analysis application 30 can compare the roaming behavior of client stations 22a,b to roaming statistics in order to detect anomalous roaming patterns exhibited by the rogue client stations 22b. As a station roams through the network, it associates with APs 18,19 that provide it better signal strength or service and de-associates with the APs 18,19 that it was associated with earlier due to reduced signal strength or service. Each intrusion detection application 32 can keep track of client station 22a,22b roaming by recording in the DB 34 association and authentication attempts for each client station 22a,b getting service through the respective switch 12.

Across the system 10, the network analysis application 30 keeps track of the client stations' history of roaming in the system 10 by means of its association and authentication attempts by periodically querying the DBs 34. The queried information includes all the APs 18 that the client 22a,b has associated with, the time that each client 22a,b has been associated with each AP 18, as well as the failed or successful association and authentication attempts.

The network analysis application 30 compares the recorded client roaming information with expected roaming statistics. The expected roaming statistics define expected thresholds for roaming behavior of client stations 22a,b, e.g., expected association times, expected locations of certain client stations 22a, expected AP hand-off counts for clients 22a moving within the system 10, number of failed association, or the like. If the roaming behavior of a particular client 22a,b is not within the expectations given by the roaming statistics, the application 30 notifies the network administrator of the anomaly and determines the current location and identity of the errant client station 22b.

An intruder walking the campus or corridors of the campus could attempt to go from AP to AP in an effort to either gain access or not stay in a single location for too long. By tracking each user's movements along with the location and history of their roaming, it is possible to detect which client stations 22a,b are moving or roaming in locations that are unexpected for that station. Additionally, if a client station 22a,b has a history of rapid associations and de-associations, or rapid movement within the network, this history could be used as an indication of an intrusion attempt within the network system 10.

Another approach to detecting rogue clients 22b is that the system 10 can monitor the protocol state machine associated with wireless client connections to detect anomalies, thus revealing the presence of the unauthorized clients 22b. Consider a situation where an authorized client 22a is in the 802.11 associated state, while rogue client 22b spoofs the identity of client 22a, and starts a new 802.11 state machine. Since the authorized client 22a will continue to send packets in the associated state, the network edge device 18 can determine that a state machine violation, and identify the spoofing client. In other words, the network edge device 18 identifies and isolates those client stations that are in fact masquerading as other clients (using protocol state machine monitoring and interaction).

A further detection scheme is to identify denial of service attacks by clients 22a,b and rogue APs attempting to associate with APs 18. Using this technique, the APs 18 are configured to monitor the protocol state machine for each client 22a,b. For example, each of the APs 18 record the number of association requests and/or probe requests from clients 22a,b and APs 19 attempting to connect to the network. Thresholds are set within the APs 18 for the normal rates of these requests. If these thresholds are exceeded at an AP 18 for a particular client, then the AP assumes that a denial of service attack is in process and alerts the network analysis application 30. The application 30 can alert the administrator to the attack, the client identity and the AP location. The application 30 can also automatically instruct the respective switch 12 to shut down the port associated with the attacked AP, or ignore packets from such a client.

In step 304, after a rogue client 22b is detected, it is disassociated from the network system 10 by terminating its network connection. The disassociation can be initiated automatically by the network analysis application 30 upon detection of the rogue client 22b, as discussed above, or manually by the network administrator, in response to the detection notice given by the application 30.

In step 306, the rogue client 22b is located physically. This can be done using signal strength and/or location attributes configured on each monitoring device 18 and 21, as discussed above in connection with step 206 of FIG. 2.

Alternatively/additionally, the AP 18 having the strongest signal to the rogue client 22b can be identified by the network analysis application 30 and reported to the administrator. This isolates the location of the rogue client 22b within the system 10. To determine which AP 18 is receiving the strongest signal, the APs 18 are configured to report to the analysis application 30 the strength of signals transmitted by clients 22a,b attempting to associate with the system 10, irrespective of whether the AP is the one receiving the strongest signal. The signal strengths and corresponding client identification information are periodically reported to the application 30 by the APs 18. The analysis application 30 compares the signal strengths to determine the strongest one, and thus, the locale of the client stations 22a,b.

The methods mentioned above can help detect access intrusion in the network system 10, and then provide the ability to kick off such intruders. In addition, the ability to find the geographic location of such unauthorized users helps networks owners immensely in resolving the problem.

While various embodiments of the invention have been described, it will be apparent to those of ordinary skill in the art that many more embodiments and implementations are possible that are within the scope of this invention. For example, any combination of any of the systems or methods described in this disclosure are possible.

What is claimed is:

1. In a system comprising one or more network switches that communicate with a network manager through a network using a standard network protocol, the one or more switches having a plurality of ports connected to a plurality of authorized wireless edge devices that permit a plurality of mobile, client stations to access the network over one or more wireless channels, and the network manager running application software that allows a network administrator to configure the ports of the one or more switches and the plurality of authorized wireless edge devices to facilitate communication over the network, a system for preventing access intrusion to the network by an unauthorized wireless edge device connected to or attempting to connect to one of the ports comprising:

the one or more switches and the plurality of authorized wireless edge devices configured, by running intrusion detection application software, to (1) collect information transmitted over the one or more wireless channels, (2) record such information in one or more statistics databases resident on the one or more switches, and (3) periodically update such information as mobile, client stations roam throughout the network;

the network manager configured, by running network-wide analysis application software, to (1) periodically query, using the standard network protocol, the one or more statistics databases resident on the one or more switches for collected information transmitted over the one or more wireless channels, and (2) record the queried information in a network-wide database resident on the network manager;

the network manager further configured, by running the network-wide analysis application software, to apply algorithms to the information stored in the network-wide database resident on the network manager to detect access intrusion to the network by the unauthorized wireless edge device connected to one of the ports; and the network manager further configured to, when access intrusion by the unauthorized wireless edge device is so detected, (1) locate the port to which the unauthorized wireless edge device is connected or attempting to connect, and (2) transmit a command to the switch containing the port, using the standard network protocol, directing the switch to automatically shut down the port, thereby denying network access to the unauthorized wireless edge device, even when the unauthorized wireless edge device does not adhere to IEEE 802.11 protocol conventions.

2. The system of claim 1 wherein the plurality of authorized wireless edge devices includes one or more wireless access points.

3. The system of claim 1 wherein the plurality of authorized wireless edge devices includes one or more sniffing access points.

4. The system of claim 1 wherein either or both the one or more switches and the plurality of authorized wireless edge devices are configured to collect the information by monitoring beacon frames emitted by the unauthorized wireless edge device.

5. The system of claim 1 wherein either or both the one or more switches and the plurality of authorized wireless edge devices are configured to collect the information by:
    transmitting a probe request; and
    detecting a probe response from the unauthorized wireless edge device.

6. The system of claim 1 wherein either or both the one or more switches and the plurality of authorized wireless edge devices are configured collect the information by:
    monitoring packet information transmitted on a wireless channel used by the unauthorized wireless edge device.

7. The system of claim 1 wherein the network manager is configured to locate the port connected to the unauthorized wireless edge device by:
    triangulating on location attributes of the unauthorized wireless edge device to determine the geographic location of the device.

8. The system of claim 1 wherein the unauthorized wireless edge device has a MAC address, a SSID, and security policies, and the network manager is configured to detect the unauthorized wireless edge device by checking one or more of the following:
    whether the MAC address is from an approved vendor;
    whether the SSID is from a list of supported SSIDs; and
    whether the security policies match the network administrator's security policies.

9. In a system comprising one or more network switches that communicate with a network manager through a network using a standard network protocol, the one or more switches having a plurality of ports connected to a plurality of authorized wireless edge devices that permit a plurality of mobile, client stations to access the network over one or more wireless channels, and the network manager running application software that allows a network administrator to configure the ports of the one or more switches and the plurality of authorized wireless edge devices to facilitate communication over the network, a method of preventing access intrusion to the network by an unauthorized wireless edge device connected to or attempting to connect to one of the ports comprising:
    in or by the one or more network switches and the plurality of authorized wireless edge devices running intrusion detection application software, (1) collecting information transmitted over the one or more wireless channels, (2) recording such information in one or more statistics databases resident on the one or more switches, and (3) periodically updating such information as mobile, client stations roam throughout the network; and
    in or by the network manager running network-wide analysis application software, (1) periodically querying, using the standard network protocol, the one or more statistics databases resident on the one or more switches for collected information transmitted over the one or more wireless channels; (2) recording the queried information in a network-wide database resident on the network manager; (3) applying algorithms to the information stored in the network-wide database resident on the network manger, thereby detecting access intrusion to the network by the unauthorized wireless edge device connected to one of the ports; (4) locating the port to which the unauthorized wireless edge device is connected or attempting to connect, and (5) transmitting a command to the switch containing the port, using the standard network protocol, directing the switch to automatically shut down the port, thereby denying network access to the unauthorized wireless edge device, even when the unauthorized wireless edge device does not adhere to IEEE 802.11 protocol conventions.

10. The method of claim 1 wherein the plurality of authorized wireless edge devices include one or more wireless access points.

11. The method of claim 1 wherein the plurality of authorized wireless edge devices includes one or more sniffing access points.

12. The method of claim 1 wherein the collecting step comprises collecting the information by monitoring beacon frames emitted by the unauthorized wireless edge device.

13. The method of claim 1 wherein the collecting step comprises:
    transmitting a probe request; and
    detecting a probe response from the unauthorized wireless edge device.

14. The method of claim 1 wherein the collecting step comprises:
    monitoring packet information transmitted on a wireless channel used by the unauthorized wireless edge device.

15. The method of claim 1 wherein the locating step comprises:
    triangulating on location attributes of the unauthorized wireless edge device to determine the geographic location of the device.

16. The method of claim 1 wherein the unauthorized wireless edge device has a MAC address, a SSID, and security policies, and the detecting comprises the network manager detecting the unauthorized wireless edge device by checking one or more of the following:
    whether the MAC address is from an approved vendor;
    whether the SSID is from a list of supported SSIDs; and
    whether the security policies match the network administrator's security policies.

* * * * *